Oct. 10, 1950     O. OTTERSON     2,525,368
TRUSSED BRAKE BEAM ASSEMBLY
Filed April 2, 1949
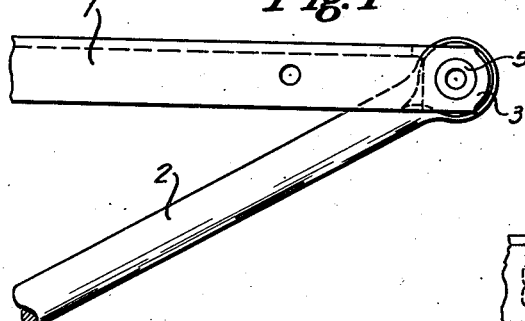
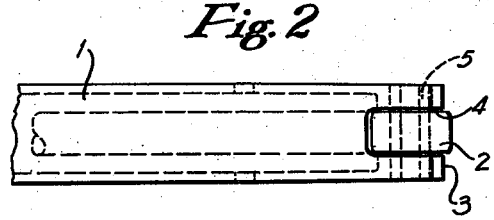
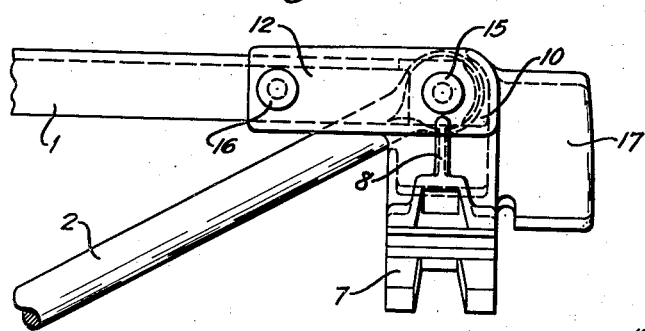
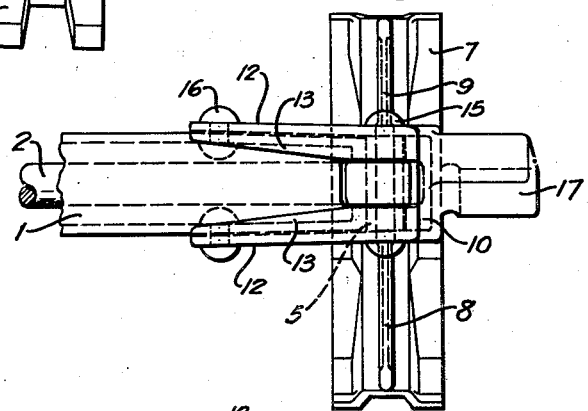
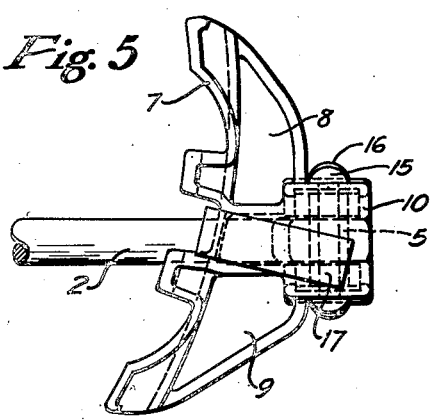
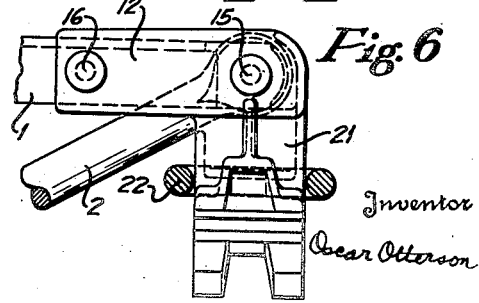
Inventor
Oscar Otterson
By
Brown, Critchlow, Flick & Peckham
his Attorneys Patented Oct. 10, 1950

2,525,368

UNITED STATES PATENT OFFICE 2,525,368

TRUSSED BRAKE BEAM ASSEMBLY

Oscar Otterson, Butler, Pa., assignor, by mesne assignments, to Schaefer Equipment Company, Pittsburgh, Pa., a corporation of Pennsylvania Application April 2, 1949, Serial No. 85,220

5 Claims. (Cl. 188—223.1)

This invention relates to brake beams for railway cars.

In the ordinary brake beam, which includes a truss formed from a compression member spaced centrally from a tension rod by a strut, the brake heads usually connect the ends of tension rod and compression member together and therefore cannot be removed without releasing the tension rod from the compression member. It is very difficult to reassemble the truss in the field, because it requires special apparatus suitable for that purpose. In my Patent No. 2,446,341, I have disclosed a brake beam in which the brake heads can be removed from the rest of the beam without disturbing the truss, but that beam requires separate tongues at its opposite ends for connecting the compression member, tension rod and brake heads together.

It is among the objects of this invention to provide a brake beam having the advantages of the one shown in my patent, in which the tension rod is connected directly to the compression member so that auxiliary connecting members are eliminated, and in which the truss can be connected either to standard brake heads supported by hangers, or to brake heads having integral lateral lugs that are supported by ledges on the truck side frames.

In accordance with this invention, a one-piece compression member, preferably channel shape, has at its opposite ends spaced upper and lower walls, between which the ends of a tension rod project. Each end of the rod and the walls above and below it are provided with aligned holes, through which a sleeve extends to connect the rod and compression member together. Brake heads have recessed bodies that receive the opposite ends of the compression member. A fastening member extends through each body and the adjacent sleeve to fasten the brake head on the compression member. Therefore, removal of the fastening member and brake head will leave the compression member and tension rod connected by means of the sleeve.

The preferred embodiment of the invention is illustrated in the accompanying drawings, in which Fig. 1 is a fragmentary plan view of one end of my brake beam truss; Fig. 2 is a rear view thereof; Figs. 3 and 4 are views similar to Figs. 1 and 2, respectively, but with the brake head in place; Fig. 5 is a fragmentary end view of the beam; and Fig. 6 is a view, similar to Fig. 3, showing a standard brake head connected to the truss.

Referring to Figs. 1 and 2 of the drawings, the truss of the brake beam is formed in the usual way from a one-piece compression member, in this case a metal channel 1, connected at its ends to the ends of a tension rod 2 whose central portion is spaced from the channel by means of the usual strut (not shown). Only one end of the truss is shown, but it will be understood that the other end has the same appearance and construction. To make the connection between the ends of the tension rod and channel, the ends of the upper and lower flanges of the channel preferably first are thickened by upsetting the opposite ends of the channel. The flanges are thickened toward each other, so that the distance between the upper and lower thickened portions 3 will be reduced. Also, the end portions of the channel web are cut away by notching the back of the compression member so that a slot 4 with parallel walls is formed in each end of it. Each slot extends entirely through the channel from front to back, and is in the plane of the beam. The thick walls 3 of the slot are provided with a pair of axially aligned holes that are in line with a similar hole through the tension rod's upset and flattened end which extends into the slot and may project slightly from all sides of it. Each end of the rod is connected to the corresponding end of the channel by means of a bushing or sleeve 5 that extends through the aligned holes, but which does not project above or below the channel. The lateral pressure on the sleeve, caused by the camber in the channel, holds the sleeve tightly in place.

As shown in Figs. 3, 4 and 5, the brake head on each end of the truss has the usual shoe-supporting portion 7 connected by vertical webs 8 and 9 to a body portion 10. The body portion is recessed to receive one end of the truss. Thus, the body may be hollow and have a rectangular opening in its inner face into which the end of the channel can be inserted. The upper and lower walls of the body engage the outer surfaces of the channel flanges. The back of the body is bifurcated to receive the upset end of the tension rod projecting from the back of the channel slot. The body also is provided with integral lateral projections 12 extending along the upper and lower flanges of the channel. These flat projections have vertical flanges 13 along their front and rear edges which overlap the front and rear edges of the channel flanges to help prevent the head from being canted thereon.

To fasten the brake heads to the truss, the body 10 of each head is provided with a pair of holes that are in axial alignment with the sleeve 5, but are only as large as the inside diameter of the sleeve. A suitable fastening member, such as a bolt or rivet 15, extends through these holes and the sleeve where it serves not only to fasten the brake head onto the truss, but also as a solid reinforcing core for the sleeve. Preferably, the lateral projections 12 of the head and the portions of the channel flanges engaged by them are provided with aligned openings through which another bolt or rivet 16 extends.

When necessary, such as when a head becomes damaged, the head can be quickly removed from the rest of the beam by merely removing the rivets 15 and 16 by which the head is held in place. The head then can be slipped off the end of the truss, but the truss will not come apart because the sleeve 5 will keep the tension rod and channel 1 connected. Therefore, the time and trouble that otherwise would be involved in reassembling the truss to receive new heads is eliminated.

The brake head shown in Figs. 3, 4 and 5 is provided with an integral lug 17 projecting laterally from its body 10 and shoe-supporting portion 7. This lug and a like lug at the opposite end of the beam are adapted to be slidably supported in a well-known manner on inclined ledges projecting inward from the side frames of a car truck. One advantage arising from this invention is that, whenever necessary or desirable, these brake heads can be removed from the truss without disassembling it and then be replaced by standard brake heads supported in the more common way by brake hangers. Such a standard head 21 is shown in Fig. 6 supported by a brake hanger 22 indicated in horizontal section. The length of the truss is such that either type of brake head will be correctly positioned relative to the wheels.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A brake beam comprising a one-piece compression member having spaced upper and lower walls at its opposite ends, a tension rod having its ends projecting between said walls, each end of the rod and said walls above and below it being provided with aligned holes, a sleeve extending through said holes to connect the rod and compression member together, brake heads having recessed bodies receiving the opposite ends of the compression member, said bodies being provided with lateral projections extending inwardly along the compression member, said projections having vertical flanges along their front and rear edges overlapping the front and rear edges of said upper and lower walls, and a fastening member extending through each of said bodies and the adjacent sleeve to fasten the brake heads on the compression member, removal of the brake heads from the compression member leaving the latter connected to the tension rod by means of said sleeves.

2. A brake beam comprising a one-piece compression member having spaced upper and lower walls at its opposite ends, the upper and lower surfaces of said member at each end thereof converging toward the adjacent end of the member, a tension rod having its ends projecting between said walls, each end of the rod and said walls above and below it being provided with aligned holes, a sleeve extending through said holes to connect the rod and compression member together, brake heads having hollow bodies receiving the opposite ends of the compression member, said bodies being provided with inwardly diverging lateral projections extending inwardly along said converging surfaces of the compression member, fastening elements extending through said projections and member, and a fastening element extending through each of said bodies and the adjacent sleeve, removal of all of said fastening elements permitting the brake heads to be removed from the compression member without disconnecting the latter from the tension rod.

3. A brake beam comprising a channel shape compression member having upper and lower flanges connected by a web, end portions of the web being removed to form slots extending entirely through the compression member from front to back, a tension rod having its ends projecting into the slots, each end of the rod and said flanges above and below it being provided with aligned holes, a sleeve extending through said holes to connect the rod and compression member together, brake heads having recessed bodies receiving the opposite ends of the compression member, said bodies being provided with lateral projections extending inwardly along the top and bottom of the compression member, said projections having vertical flanges along their front and rear edges overlapping the front and rear edges of said compression member flanges, and a fastening member extending through each of said bodies and the adjacent sleeve to fasten the brake heads on the compression member, removal of the brake heads from the compression member leaving the latter connected to the tension rod by means of said sleeves.

4. A brake beam comprising a channel shape compression member having upper and lower flanges connected by a web, end portions of the web being removed to form slots extending entirely through the compression member from front to back, the portions of said flanges forming the upper and lower walls of the slots being thickened to reduce the height of the slots, a tension rod having its ends projecting into the slots, each end of the rod and the adjoining thickened portions of the flanges being provided with aligned holes, a sleeve extending through said holes to connect the rod and compression member together, brake heads having hollow bodies receiving the opposite ends of the compression member, said bodies being provided with lateral projections extending inwardly along the top and bottom of the compression member, fastening elements extending through said projections and flanges, and a fastening element extending through each of said bodies and the adjacent sleeve, removal of all of said fastening elements permitting the brake heads to be removed from the compression member without disconnecting the latter from the tension rod.

5. In a brake beam, a truss comprising a channel shape compression member having upper and lower flanges connected by a web, end portions of the web being removed to form slots extending entirely through the compression member from front to back, the portions of said flanges forming the upper and lower wall of the slots being thickened to reduce the height of the slots, a tension rod having its central portion spaced from said member and having its ends projecting into the slots, each end of the rod and the adjoining thickened portions of the flanges being provided with aligned holes, and a sleeve extending through said holes to connect the rod and compression member together, each sleeve being adapted to receive a fastening member for holding a brake head on the truss, the distance between the axes of the sleeves being such that the truss can be used interchangeably with hanger-supported brake heads and lug-supported brake heads.

OSCAR OTTERSON.

REFERENCES CITED

The following references are of record in the file of this patent:

UNITED STATES PATENTS

| Number | Name | Date |
|---|---|---|
| 955,239 | Williams, Jr. | Apr. 19, 1910 |
| 956,616 | Williams, Jr. | May 3, 1910 |
| 2,455,316 | Schaefer | Nov. 30, 1948 |
| 2,486,066 | Schaefer | Oct. 25, 1949 |